(12) United States Patent
Flowers

(10) Patent No.: US 6,923,167 B2
(45) Date of Patent: Aug. 2, 2005

(54) CONTROLLING AND OPERATING HOMOGENEOUS CHARGE COMPRESSION IGNITION (HCCI) ENGINES

(75) Inventor: Daniel L. Flowers, San Leandro, CA (US)

(73) Assignee: The Regents of the University of California, Oakland, CA (US)

(*) Notice: Subject to any disclaimer, the term of this patent is extended or adjusted under 35 U.S.C. 154(b) by 53 days.

(21) Appl. No.: 10/452,160

(22) Filed: May 30, 2003

(65) Prior Publication Data

US 2005/0121009 A1 Jun. 9, 2005

(51) Int. Cl.[7] .............................................. F02M 25/07
(52) U.S. Cl. .................. 123/568.15; 60/605.2
(58) Field of Search ............... 123/568.11, 568.12, 123/568.15, 568.17, 598.19, 568.21, 295, 123/305, 559.1, 563; 60/605.2, 599

(56) References Cited

U.S. PATENT DOCUMENTS

| | | | | |
|---|---|---|---|---|
| 3,800,533 A | * | 4/1974 | Zankowski | 123/568.15 |
| 3,866,585 A | * | 2/1975 | Kopa | 123/568.15 |
| 4,040,403 A | * | 8/1977 | Rose et al. | 123/568.15 |
| 4,445,485 A | * | 5/1984 | Chamness, Jr. | 123/568.15 |
| 4,769,995 A | | 9/1988 | Serve et al. | |
| 5,285,756 A | | 2/1994 | Squires | |
| 5,379,728 A | * | 1/1995 | Cooke | 123/568.15 |
| 6,260,520 B1 | | 7/2001 | Van Reatherford | |
| 6,390,054 B1 | | 5/2002 | Yang | |
| 2002/0059907 A1 | | 5/2002 | Thomas | |

* cited by examiner

Primary Examiner—Willis R. Wolfe, Jr.
(74) Attorney, Agent, or Firm—Eddie E. Scott; Alan H. Thompson

(57) ABSTRACT

A Homogeneous Charge Compression Ignition (HCCI) engine system includes an engine that produces exhaust gas. A vaporization means vaporizes fuel for the engine an air induction means provides air for the engine. An exhaust gas recirculation means recirculates the exhaust gas. A blending means blends the vaporized fuel, the exhaust gas, and the air. An induction means inducts the blended vaporized fuel, exhaust gas, and air into the engine. A control means controls the blending of the vaporized fuel, the exhaust gas, and the air and for controls the inducting the blended vaporized fuel, exhaust gas, and air into the engine.

16 Claims, 3 Drawing Sheets

CONTROLLING AND OPERATING HOMOGENEOUS CHARGE COMPRESSION IGNITION (HCCI) ENGINES

The United States Government has rights in this invention pursuant to Contract No. W-7405-ENG-48 between the United States Department of Energy and the University of California for the operation of Lawrence Livermore National Laboratory.

BACKGROUND

1. Field of Endeavor

The present invention relates to engines and more particularly to Homogeneous Charge Compression Ignition (HCCI) Engines.

2. State of Technology

U.S. Pat. No. 4,769,995 issued Sep. 13, 1988 for an air-fuel ratio controller for a turbocharged internal combustion engine to J. Vincent Serve and David W. Eckard and assigned to Cooper Industries, Inc. provides the following state of technology information, "A conventional air-fuel ratio controller regulates air-to-fuel ratio by controlling air manifold pressure as a function of gas manifold pressure and engine speed. While such a controller maintains a relatively constant air-to-fuel ratio for a wide range of loads, the ratio provided by such a controller occasionally deviates from an optimum value. One such occasion arises when fuel heating values vary. Accordingly, a need for an air-fuel ratio controller which is capable of correcting for varying fuel heating values has been recognized."

U.S. Pat. No. 5,285,756 issued Feb. 15, 1994 for a gaseous fuel injection valve and actuator to Vaughn A. Squires and assigned to Cooper Industries, Inc. provides the following state of technology information, "In the operation of reciprocating engines that operate by internal combustion of gaseous fuels as natural gas, fuel injection valves are critical to smooth operation of the engine. Typically, each cylinder of such a reciprocating engine has a fuel injection valve communicating therewith, the operation of the fuel injection valve necessary for smooth, efficient operation of the engine."

U.S. Pat. No. 6,260,520 Homogeneous charge compression ignition internal combustion engine issued Jul. 17, 2001 to Larry Van Reatherford and assigned to Ford Global Technologies provides the following state of technology information, "The HCCI engine offers tantalizing potential for low hydrocarbon emissions and low NOx emissions coupled with significant fuel economy improvement. Unlike its better known compression ignition cousin, the diesel engine, the HCCI engine may be operated soot free and also with low NOx emissions because there is no locally rich zone of combustion. Rather, ignition occurs spontaneously and concurrently at many points in the combustion chamber. A problem heretofore, however, has resided in the lack of capability to precisely control the onset of the ignition event. The present invention solves this problem. Another problem with previous HCCI engines was the apparent inability to operate satisfactorily on fuels having a wide range of cetane or octane ratings. An engine according to this present invention has adaptable timing capability which will allow fuel quality to be accurately and adequately handled."

U.S. Pat. No. 6,390,054 issued May 21, 2002 for engine control strategy for a hybrid HCCI engine to Jialin Yang and assigned to Ford Global Technologies, Inc. provides the following state of technology information, "The HCCI engine is a relatively new type of engine. It has the benefits of very low NOx emissions due to the low combustion temperatures of the diluted mixture, and zero soot emissions due to the premixed lean mixture. Also, thermal efficiency of the HCCI engine is higher than SI engines and is comparable to conventional compression ignition engines due to the high compression ratio, unthrottled operation, high air-fuel ratio, reduced radiation heat transfer loss, and the low cycle-to-cycle variation of HCCI combustion."

U.S. Patent Application No. 2002/0059907 published May 23, 2002 for homogenous charge compression ignition and barrel engines by Charles Russell Thomas provides the following state of technology information, "Another combustion strategy, referred to herein as homogenous charge compression ignition (HCCI) . . . In HCCI, a mixture of air and fuel is drawn into a combustion cylinder. The mixture is then compressed until the mixture autoignites, without the introduction of a spark. Variations on HCCI include injection of fuel directly into the cylinder at some point during the compression stroke so as to promote a substantially premixed charge. The HCCI combustion strategy has been referred to by various names, including controlled auto-ignition combustion (Ford), premixed charged compression ignition (Toyota and VW), active radical combustion (Honda), fluid dynamically controlled combustion (French Petroleum Institute), and active thermo combustion (Nippon Engines)."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a Homogeneous Charge Compression Ignition (HCCI) engine system. It includes an engine that produces exhaust gas. A vaporization means vaporizes fuel for the engine an air induction means provides air for the engine. An exhaust gas recirculation means recirculates the exhaust gas. A blending means blends the vaporized fuel, the exhaust gas, and the air. An induction means inducts the blended vaporized fuel, exhaust gas, and air into the engine. A control means controls the blending of the vaporized fuel, the exhaust gas, and the air and for controls the inducting the blended vaporized fuel, exhaust gas, and air into the engine.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
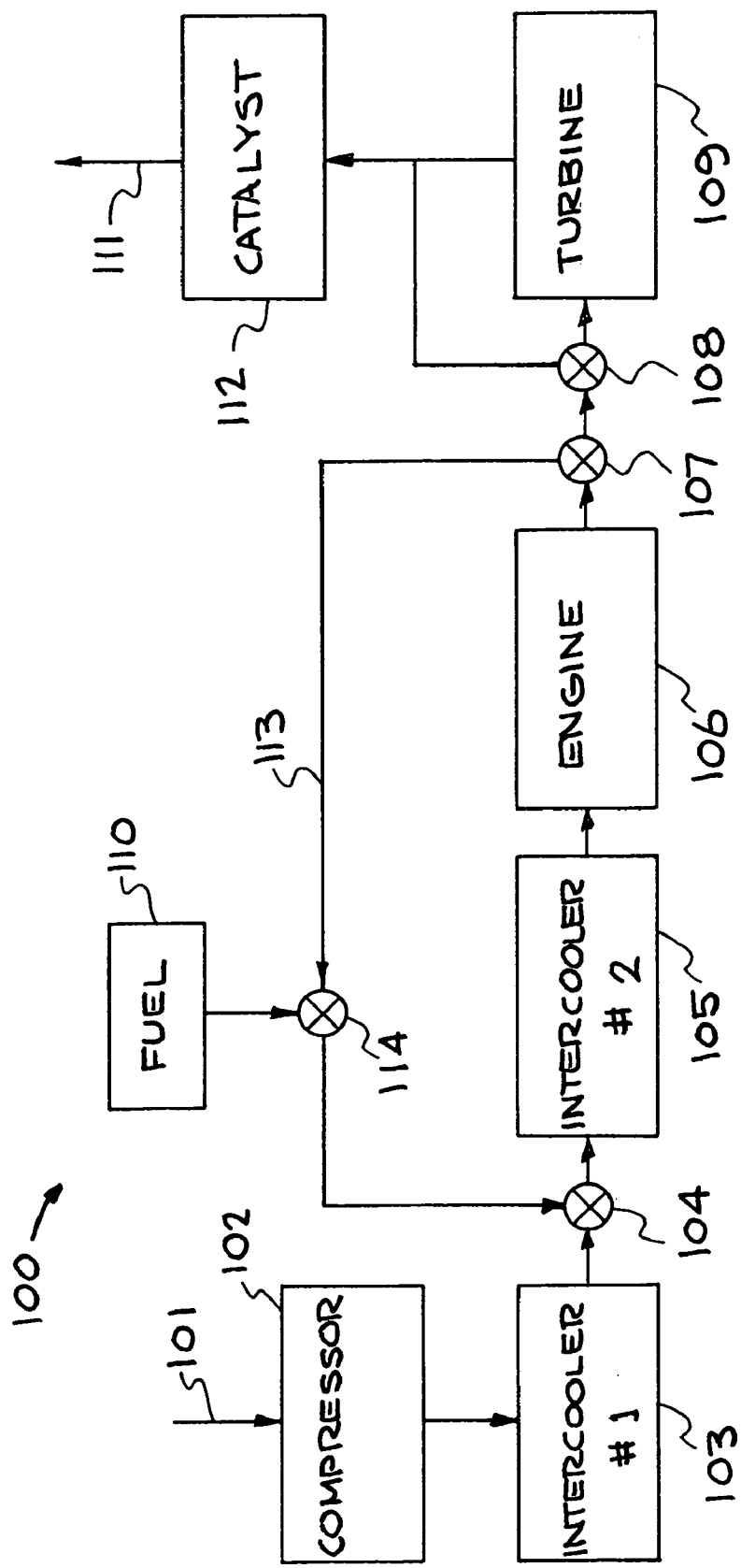
FIG. 1 illustrates specific embodiment of the invention.

Referring now to the drawings, to the following detailed description, and to incorporated materials; detailed information about the present invention is provided including the description of specific embodiments. The detailed description and the specific embodiments serve to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

One specific embodiment of the invention is show in FIG. 1. This specific embodiment, designated generally by the reference numeral 100. The system 100 provides a Homogeneous Charge Compression Ignition (HCCI) engine system. It includes an engine that produces exhaust gas. A vaporization means vaporizes fuel for the engine an air induction means provides air for the engine. An exhaust gas recirculation means recirculates the exhaust gas. A blending means blends the vaporized fuel, the exhaust gas, and the air. An induction means inducts the blended vaporized fuel, exhaust gas, and air into the engine. A control means controls the blending of the vaporized fuel, the exhaust gas, and the air and for controls the inducting the blended vaporized fuel, exhaust gas, and air into the engine.

Air 101 is directed into engine 106 through valve 104. Exhaust gas from engine 106 is directed to EGR valve 107. Exhaust gas from EGR valve 107 is directed through Exhaust Gas Recirculation (EGR) loop 113. Exhaust Gas Recirculation (EGR) loop 113 extends between EGR valve 107 and valve 104. Fuel 110 is introduced into the Exhaust Gas Recirculation (EGR) loop 113 through valve 114. The air 101 is inducted into the intake of the engine 106. The air 101 is blended with the vaporized fuel and recirculated exhaust gas. This mixture is then inducted into the engine where HCCI combustion occurs. The exhaust is flowed out of the engine 106. The EGR valve 107 is used to flow some of this exhaust through the EGR loop 113.

The system 100 allows for utilization of low volatility fuels in that the fuel 110 is injected in the exhaust gas recirculation (EGR) loop 113. Exhaust gas recirculation dilutes the fuel-air mixture to reduce oxides of nitrogen. This recycled exhaust gas is very hot (usually greater than 500 Celsius). Low-volatility fuels like diesel will readily evaporate in this kind of environment. This vaporized fuel and recirculated exhaust gas can easily be blended with inducted air to create the uniform mixture necessary for HCCI combustion.

Referring again to FIG. 1, the Homogeneous Charge Compression Ignition (HCCI) engine system 100 will be described in greater detail. Air 101 is directed into compressor 102. The compressed air is directed into the intercooler #1 designated by the reference numeral 103. The output of intercooler #1 is directed to valve 104 and into intercooler #2 designated by the reference numeral 105. The output of intercooler #2 is directed into engine 106. Exhaust gas from engine 106 is directed to EGR valve 107. Exhaust gas from EGR valve 107 is directed into wastegate 108 and into turbine 109. The exhaust gas from turbine 109 is directed through catalyst 112 and exhausted as exhaust 111. Exhaust gas from EGR valve 107 is directed into Exhaust Gas Recirculation (EGR) loop 113 that extends between EGR valve 107 and valve 104. Fuel 110 is introduced into the Exhaust Gas Recirculation (EGR) loop 113 through valve 114.

The structural details of the Homogeneous Charge Compression Ignition (HCCI) engine system 100 having been described, the operation of the system 100 will now be considered. Air 101 is inducted into the intake of the engine 106. The air 101 can be compressed through compressor 102 or through a supercharger or turbine-driven turbocharger. The compressor 102 is useful in getting high power output. Intercooler #1 can be used to cool the air 101 if desired. The air 101 is blended with the vaporized fuel and recirculated exhaust gas. Intercooler #2 can be used to cool this mixture. This mixture is then inducted into the engine where HCCI combustion occurs. The exhaust is flowed out of the engine 106. The EGR valve 107 is used to flow some of this exhaust through the EGR loop 113. The balance of the exhaust is flowed through turbine 109. Turbine can be part of the turbocharger system with a bypass through a wastegate 108. The exhaust is then be flowed through catalyst 112 for aftertreatment of exhaust products such as unburned or partially burned hydrocarbons, carbon monoxide, or possibly even oxides of nitrogen. The catalyst 112 could also be placed upstream of the turbine 109, which might be useful in recovering some heat to drive the turbine.

Figure 2:
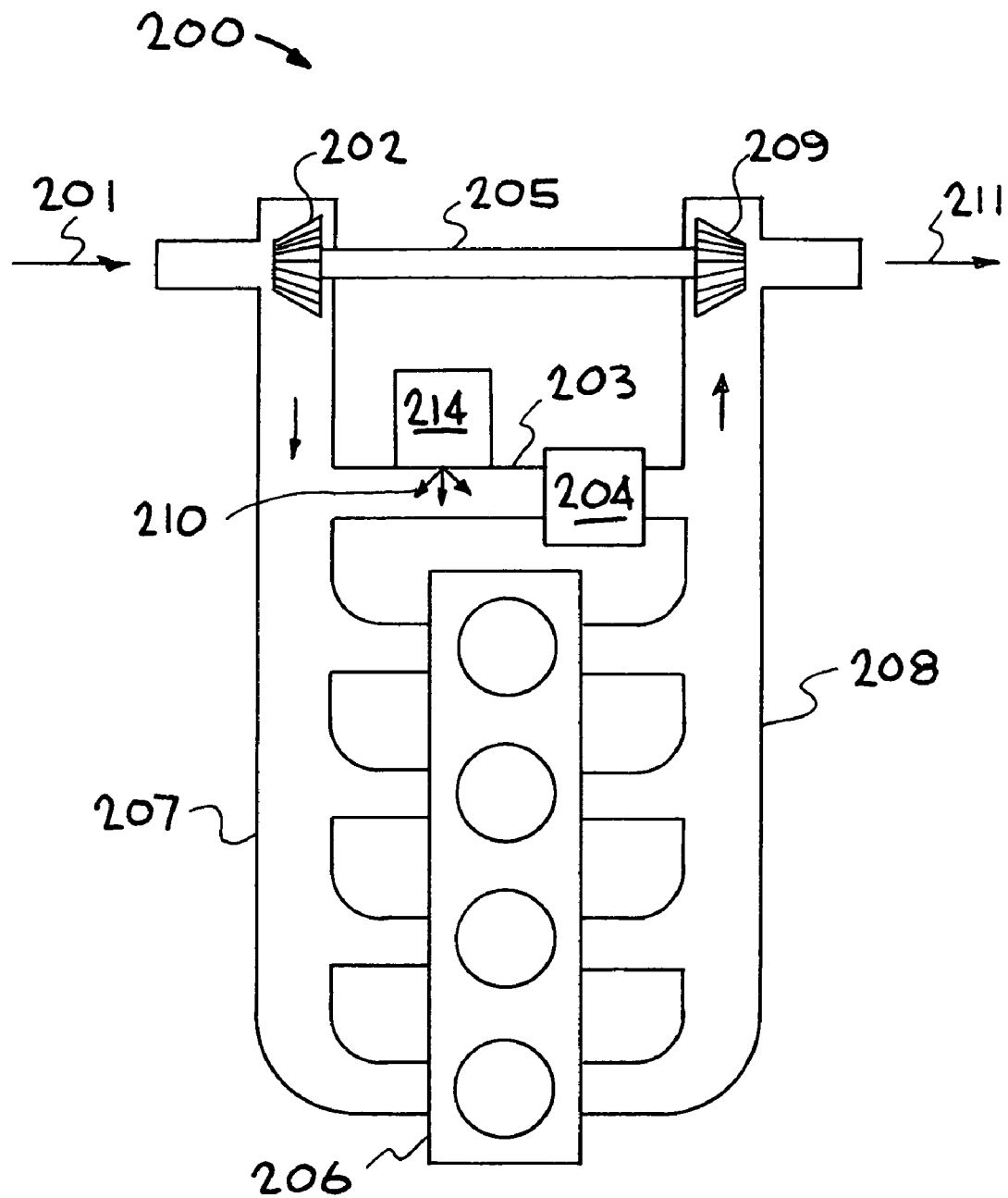
FIG. 2 illustrates another specific embodiment of the invention.

Referring now to FIG. 2, another specific embodiment of the invention is illustrated. This specific embodiment, designated generally by the reference numeral 200. The system 200 provides a Homogeneous Charge Compression Ignition (HCCI) engine system. It includes an engine 206 that produces exhaust gas. A vaporization means vaporizes fuel for the engine an air induction means provides air for the engine. An exhaust gas recirculation means recirculates the exhaust gas. A blending means blends the vaporized fuel, the exhaust gas, and the air. An induction means inducts the blended vaporized fuel, exhaust gas, and air into the engine. A control means controls the blending of the vaporized fuel, the exhaust gas, and the air and for controls the inducting the blended vaporized fuel, exhaust gas, and air into the engine.

The system 200 allows for utilization of low volatility fuels in that the fuel 210 is injected in the exhaust gas recirculation (EGR) loop 213. Air 201 is directed into engine 206 through compressor 202. Exhaust gas from engine 206 is directed to through Exhaust Gas Recirculation (EGR) loop 213. Fuel 210 is introduced into the Exhaust Gas Recirculation (EGR) loop 213 through fuel injector 214. Exhaust gas recirculation dilutes the fuel-air mixture to reduce oxides of nitrogen. This recycled exhaust gas is very hot (usually greater than 500 Celsius). Low-volatility fuels like diesel will readily evaporate in this kind of environment. This vaporized fuel and recirculated exhaust gas can easily be blended with inducted air to create the uniform mixture necessary for HCCI combustion.

Referring again to FIG. 2, the Homogeneous Charge Compression Ignition (HCCI) engine system 200 will be described in greater detail. Air 201 is inducted into the intake side 207 of the engine 206. The air 201 is compressed by compressor 202. The compressor 202 is useful in getting high power output. The engine 206 produces exhaust gas on exhaust side 208. Some of the exhaust flows through EGR pipe 203 through EGR control valve 204. This provides the EGR loop 213. Fuel 210 is introduced into the Exhaust Gas Recirculation (EGR) loop 213 through fuel injector 214. This mixture is then inducted into the engine where HCCI combustion occurs. The exhaust 211 is flowed out of the engine 206 through turbine 209.

Figure 3:
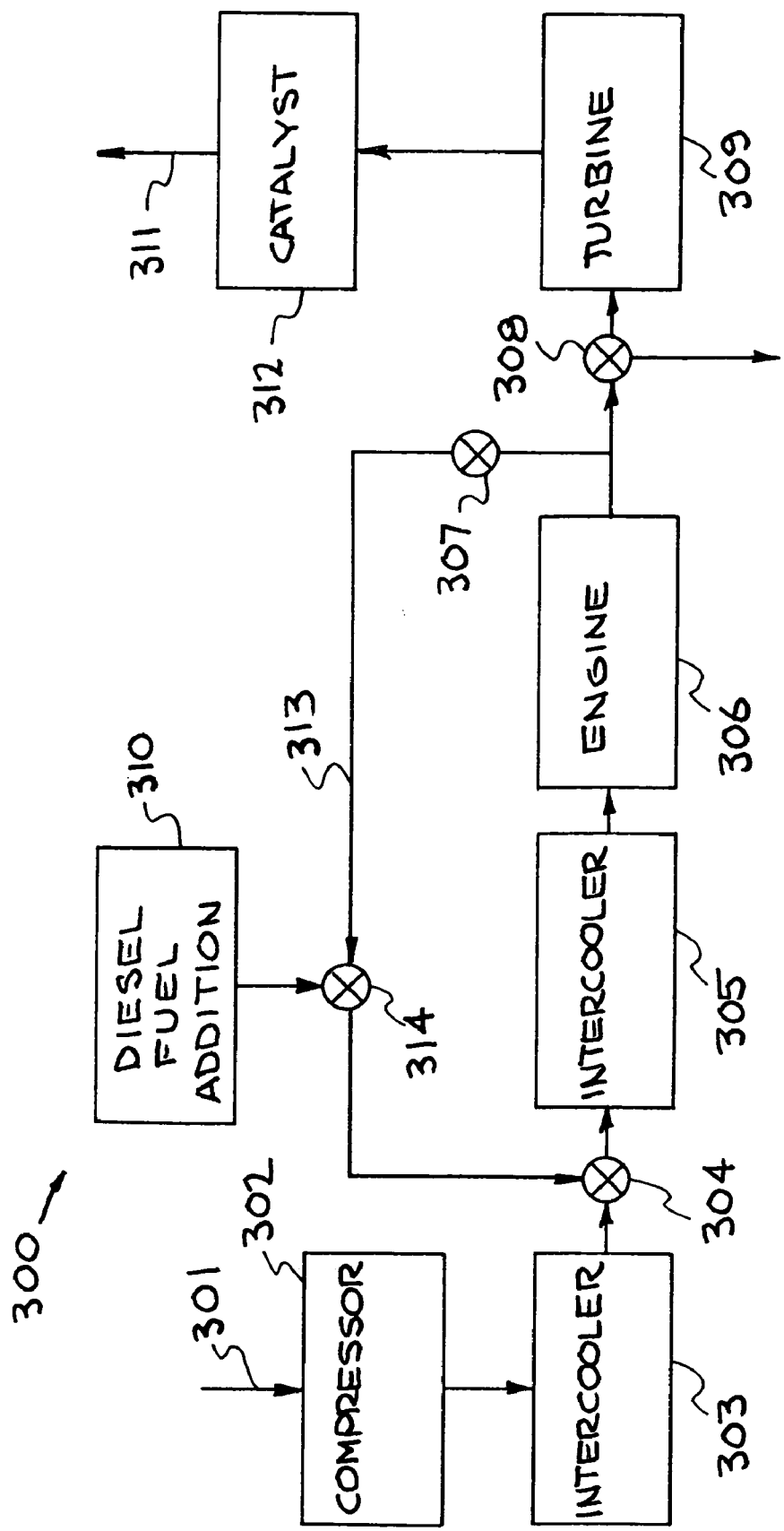
FIG. 3 illustrates yet another specific embodiment of the invention.

Another specific embodiment of the present invention is illustrated in FIG. 3. This specific embodiment, designated generally by the reference numeral 300. The system 300 provides a Homogeneous Charge Compression Ignition (HCCI) engine system. It includes an engine that produces exhaust gas. A vaporization means vaporizes fuel for the engine an air induction means provides air for the engine. An exhaust gas recirculation means recirculates the exhaust gas. A blending means blends the vaporized fuel, the exhaust gas, and the air. An induction means inducts the blended vaporized fuel, exhaust gas, and air into the engine. A control means controls the blending of the vaporized fuel, the exhaust gas, and the air and for controls the inducting the blended vaporized fuel, exhaust gas, and air into the engine.

Air 301 is directed into engine 306 through valve 304. Exhaust gas from engine 306 is directed to EGR valve 307 and waste gate control valve 308. Exhaust gas from EGR valve 307 is directed through Exhaust Gas Recirculation (EGR) loop 313. Exhaust Gas Recirculation (EGR) loop 313 extends between the exhaust from engine 306 and valve 304. Diesel fuel 310 is introduced into the Exhaust Gas Recirculation (EGR) loop 313 through valve 314. The air 301 is inducted into the intake of the engine 306. The air 301 is blended with the vaporized diesel fuel and recirculated exhaust gas. This mixture is then inducted into the engine 306 where HCCI combustion occurs. The exhaust is flowed out of the engine 306. The EGR valve 307 is used to flow some of this exhaust through the EGR loop 313.

The system 300 allows for utilization of low volatility fuels, such as diesel fuel, in that the diesel fuel 310 is injected in the exhaust gas recirculation (EGR) loop 313. Exhaust gas recirculation dilutes the fuel-air mixture to reduce oxides of nitrogen. This recycled exhaust gas is very hot (usually greater than 500 Celsius). Low-volatility fuels like diesel will readily evaporate in this kind of environment. This vaporized fuel and recirculated exhaust gas can easily be blended with inducted air to create the uniform mixture necessary for HCCI combustion.

Referring again to FIG. 3, the Homogeneous Charge Compression Ignition (HCCI) engine system 300 will be described in greater detail. Air 301 is directed into compressor 302. The compressed air is directed into the intercooler 303. The output of intercooler 30 is directed to valve 304 and into intercooler 305. The output of intercooler 305 is directed into engine 306. Exhaust gas from engine 306 is directed to EGR valve 307. Additional exhaust gas is directed into wastegate control valve 308 and into turbine 309. The exhaust gas from turbine 309 is directed through catalyst 312 and exhausted as exhaust 311. Exhaust gas from EGR valve 307 is directed through the Exhaust Gas Recirculation (EGR) loop 313 that extends between the exhaust of engine 306 and valve 304. Diesel fuel 310 is introduced into the Exhaust Gas Recirculation (EGR) loop 313 through valve 314.

Control of combustion timing in HCCI engines depends on controlling the temperature, pressure, and composition history of the mixture during the compression stroke in an engine. For a given engine with a specified compression ratio, this means that the temperature, pressure and composition at the start of compression determine when combustion will begin in the engine cycle (start of combustion, SOC). The system 300 allows for controlling combustion timing at the beginning of the cycle. The selection of the control parameters must be done in context of optimizing the performance of the engine. This means judicious choice of compression, EGR levels, amount of injected fuel, and level of intercooling. The temperature, pressure, and composition in the engine at the start of the cycle control timing of the start of combustion in the engine cycle. Control of each of these parameters will be discussed separately below:

Control of Intake Pressure

The compressor controls intake pressure. The compressor can be used to increase the intake pressure from ambient pressure to the desired level, within the limits of available equipment. The intake pressure could also be reduced from ambient pressure by using a throttle. Some pressure drop could occur through the intercooling sections and other parts of the intake system.

Control of Intake Composition

The intake composition will be determined by the flow rate and composition of the exhaust gas, the flow rate of air into the system, and the flow rate of fuel added to the system. These flows will be balanced to achieve the desired composition.

Control of Intake Temperature

Four parameters affect intake temperature: 1) Compression heating by the compressor. Compression of air in the compressor will result in a certain amount of heating of the air. 2) Intercooling of the inducted air. The compression-heated air can be cooled to the desired level in the first intercooling stage. 3) Temperature of the recirculated exhaust gas and fuel mixture. 4) Intercooling of the fuel, recirculated exhaust gas, and fuel mixture. The temperature of the fuel, recirculated exhaust gas, and fuel mixture will be determined by the flow rate of air through the compressor, and the flow rate of EGR set by the EGR control valve, as well as the flow rate of fuel. The mixture before the intercooler must be hot enough to achieve combustion at the desired time in the cycle. If it is not hot enough, more hot EGR can be added by adjusting the EGR control valve. If it is too hot, the temperature of the mixture can be reduced by intercooling. By balancing these parameters the temperature can be precisely controlled.

The control system requires hot residual gas operate. At startup, no hot residual gas is available. Several options solve this problem.

1) Inject the low volatility fuel into the initially cool air in the EGR loop. The air may not be hot enough to get complete evaporation of the fuel, but enough of the fuel could be evaporated and mixed to get the engine started. A glow plug could be used to enhance the evaporation of the fuel at startup. It is likely that some of the fuel would evaporate, but much of it would not and this unevaporated fuel would pool in the system. As the exhaust gas warms up, this unevaporated fuel would quickly evaporate. The liquid fuel would be prevented from flowing into the engine combustion chamber. It could be possible to start up the engine directly in HCCI mode, or by using spark-ignition for the beginning part of the cycle.

2) Start up engine as a conventional direct injection diesel engine. Conventional diesel engines are able to start under a wide range of ambient conditions and would produce hot exhaust that would facilitate transition to the HCCI mode described above. Once satisfactory HCCI operation is obtained, the direct injection system would be turned off. This system would also allow for multimode operation of the engine (HCCI operation for certain conditions, Diesel operation for others).

3) Use a burner to generate hot gasses to run in the exhaust gas recirculation system. The burner gasses would be sufficiently hot to allow the fuel to evaporate and begin the operation in HCCI mode. Hot exhaust gas from subsequent HCCI engine operation would be sufficient to continue operation without the burner. It may be necessary to run the burner at some level for several cycles to generate gasses hot enough to sustain operation in HCCI mode. Once satisfactory HCCI operation is achieved the burner would be turned off.

4) A more volatile fuel that would readily evaporate and react could be used for startup. The engine could be started on this starter fuel and then transitioned to the less volatile primary fuel. The starter fuel could be gradually decreased until satisfactory HCCI combustion is achieved with the primary fuel.

The present invention provides Homogeneous Charge Compression Ignition (HCCI) combustion technology for internal combustion reciprocating piston engines. The HCCI process involves having well mixed gasses (fuel, air, residual and recycled exhaust gasses) in the engine combustion chamber and compress this mixture until it reaches temperatures at which it will autoignite. HCCI combustion has great benefits because it can achieve the lowest possible peak combustion temperatures and therefore the lowest possible emissions of oxides of nitrogen (a chief component in formation of photochemical smog) from a combustion engine. In addition, the homogeneity of HCCI combustion results in very low soot emissions. HCCI engines can likely be operated without an intake throttle and with high compression ratios; therefore high engine efficiency is possible. The present invention has uses in both transportation (automobiles, heavy trucks, locomotives, ships, etc.) and stationary power generation (continuous power, stand-by power, distributed generation).

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A homogeneous charge compression ignition engine system, comprising:
    an engine that produces exhaust gas,
    vaporization means for vaporizing fuel for said engine,
    air induction means for providing air for said engine,
    exhaust gas recirculation means for recirculating said exhaust gas,
    first blending means for blending said vaporized fuel with said exhaust gas,
    second blending means for blending said vaporized fuel and said exhaust gas with said air,
    induction means for inducting said blended vaporized fuel, exhaust gas, and air into said engine, and
    control means for controlling said blending of said vaporized fuel, said exhaust gas, and said air and for controlling said inducting said blended vaporized fuel, exhaust gas, and air into said engine.

2. The homogeneous charge compression ignition engine system of claim 1, wherein said air induction means for providing air for said engine comprises a compressor.

3. The homogeneous charge compression ignition engine system of claim 1, wherein said air induction means for providing air for said engine comprises a turbine.

4. The homogeneous charge compression ignition engine system of claim 1, wherein said air induction means for providing air for said engine comprises a supercharger.

5. The homogeneous charge compression ignition engine system of claim 1, wherein said air induction means for providing air for said engine comprises a turbocharger.

6. The homogeneous charge compression ignition engine system of claim 1, wherein said air induction means for providing air for said engine includes an intercooler.

7. The homogeneous charge compression ignition engine system of claim 1, wherein said induction means for inducting said blended vaporized fuel, exhaust gas, and air into said engine includes an intercooler.

8. The homogeneous charge compression ignition engine system of claim 1 including a catalyst for treatment of said exhaust gas.

9. A homogeneous charge compression ignition engine system, comprising:
    an engine that produces exhaust gas,
    an injector that vaporizes fuel for said engine,
    an air induction means for providing air for said engine,
    exhaust gas recirculation means for recirculating said exhaust gas,
    means for mixing said exhaust gas with said vaporized fuel,
    means for mixing said air and said mixed exhaust gas and said vaporized fuel and inducting said mixed exhaust gas, said vaporized fuel, and said air into said engine, and
    control means for controlling the amount of said mixed exhaust gas, said vaporized fuel, and said air that is inducted into said engine.

10. The homogeneous charge compression ignition engine system of claim 9, wherein said air induction means for providing air for said engine comprises a compressor.

11. The homogeneous charge compression ignition engine system of claim 9, wherein said air induction means for providing air for said engine comprises a turbine.

12. The homogeneous charge compression ignition engine system of claim 9, wherein said air induction means for providing air for said engine comprises a supercharger.

13. The homogeneous charge compression ignition engine system of claim 9, wherein said air induction means for providing air for said engine comprises a turbocharger.

14. The homogeneous charge compression ignition engine system of claim 9, wherein said air induction means for providing air for said engine includes an intercooler.

15. The homogeneous charge compression ignition engine system of claim 9, wherein said exhaust gas recirculation means includes an intercooler.

16. The homogeneous charge compression ignition engine system of claim 9 including a catalyst for treatment of said exhaust gas.

* * * * *